April 15, 1947.   F. D. HERBERT, JR   2,419,074
DEVICE FOR INTRODUCING MOTION INTO SEALED INSTRUMENTS
Filed July 21, 1945
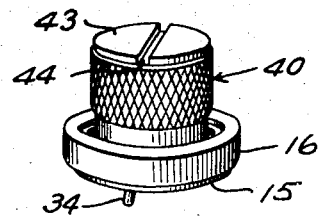
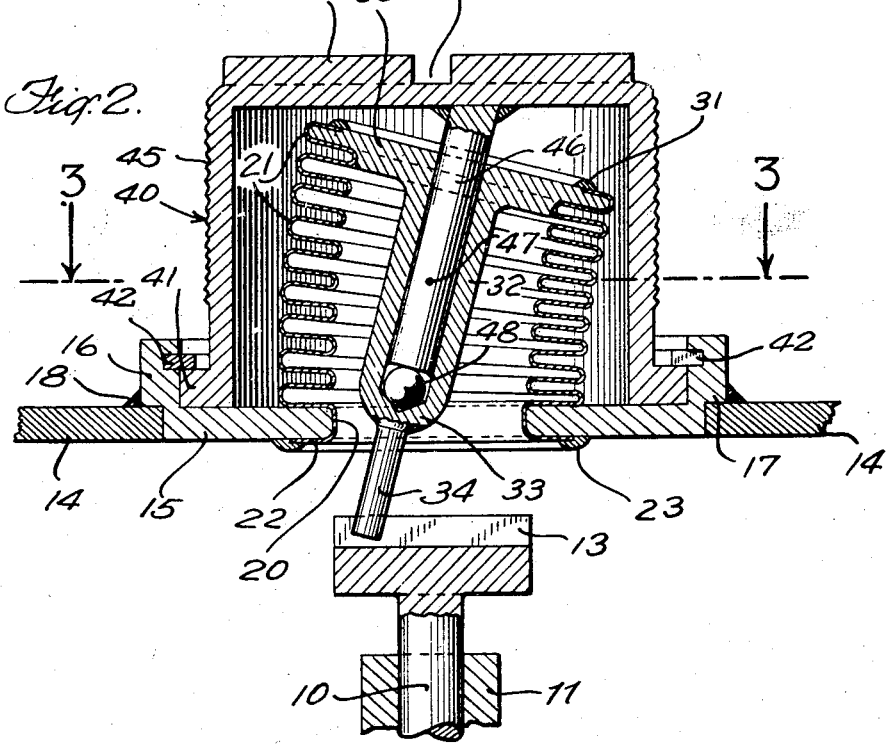
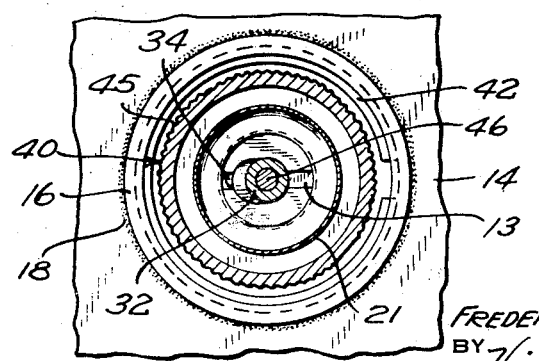
INVENTOR
FREDERICK D. HERBERT, JR
BY
ATTORNEY Patented Apr. 15, 1947

2,419,074

UNITED STATES PATENT OFFICE 2,419,074

DEVICE FOR INTRODUCING MOTION INTO SEALED INSTRUMENTS

Frederick D. Herbert, Jr., Upper Montclair, N. J., assignor, by mesne assignments, to Kearfott Company, Inc., New York, N. Y., a corporation of New York Application July 21, 1945, Serial No. 606,418

2 Claims. (Cl. 286—29)

This invention relates to motion transmitting units which are adapted for the introduction of movement from an external source into a sealed mechanism without impairing the seal. More particularly it relates to devices for that purpose which have an input crank member axially alined with the internal member to be actuated, and in which a lever has an eccentric connection at its ends with the two members and is so disposed as to cross the axis and has a universal pivot at the point of intersection with the axis. Each end of such a lever is constrained to move in an arc, the relative diameters of the two arcs depending upon the disposition of the pivot along the axis, in other words, upon the inclination of the lever to the axis with a given spacing of the driving and driven members.

In order to preserve the seal, it is well known that devices of this sort may employ a flexible bellows having one end free for movement and hermetically sealed to the lever, and its other end fixed and secured so as effectively to seal the interior of the mechanism casing about the input member.

Embodiments of the present invention are particularly designed and adapted for the purpose of introducing slight adjustments into a sealed mechanism, such as is commonly effected by the turning of a screw head. An example of such adjustment is what are known as zero resets or adjustments, where a slight adjustment of spring tension may be required occasionally to cause a hand to return accurately to zero from a positive reading.

Since such transmission units may be of miniature size with a head not much larger than a screw head and permissively provided with a screw slot for engagement by a screw driver, it is a purpose of this invention to provide a combined transmitting and sealing construction of the type described which will be particularly adapted for incorporation in such small units.

Other general objects of the invention are simplicity of design, reliability in operation, ease of manipulation and durability in construction. Still other objects and advantages of the invention will appear from the following description.

One of the features of the invention which particularly adapts it for small size units is the elimination of the usual ball and socket type of pivot for the oblique lever. Instead the lever has a virtual rather than an actual or physical pivot.

Specifically the device includes a cap or small, cup shape housing simulating a knob, the open end of which rotatively bears on a plate having an axial hole through which the lever end protrudes. Inside the cap or housing are the bellows and the lever operatively connected in such manner as to dispense with a physical universal socket.

More particularly, the lever is in two telescopic parts, one part, which is the outer part, being carried by the head of the bellows and including the operating end, and the other part being carried by and fixed to the head of the cap or housing and inclined to the axis and intersecting it. The point of intersection and the angle of the lever to the axis of the housing determine the locus of the pivot and the diameter of the arc described by the protruding end of the lever. Preferably the part of the lever which is carried by the cap head is eccentrically attached thereto, and the inclination is such as to bring the intersection well within the bellows and relatively close to the head end thereof, so as to minimize the lateral component of movement of the free end of the bellows.

The illustrated embodiment of the invention will now be described, after which the invention will be pointed out in claims.

Fig. 1 is a perspective of a unit embodying the invention.

Fig. 2 is a sectional elevation of the same on enlarged scale and showing a portion of a casing and a part to be driven in operative relation thereto.

Fig. 3 is a sectional plan on the plane indicated by the line 3—3 in Fig. 2.

Referring to the drawing more in detail, the invention is shown as applied to a device for adjusting a set screw 10 which is rotative in a fixed support 11 and is provided with a head 12 having a screw driver slot 13. The set screw 10, however, is representative of any rotary member which is to be actuated by external means. The set screw 10 is mounted within a closed chamber having a sealed external casing 14 only a portion of which is shown.

The casing 14 is provided with an opening registering with the set screw 10 in which an annular plate 15 is sealed. The plate 15 is provided with an external flange 16 having a shoulder 17 which seats against the casing 14. The plate 15 may be sealed in place by suitable means such as a ring of solder 18.

The annular plate 15 is provided with a central opening 20 registering with the set screw 10. A flexible bellows 21 of suitable metal surrounds the opening 20 and one end of the bellows is flanged over the plate 15 to form a sealing flange 22 which is sealed to the plate 15 by suitable means, shown as a ring of solder 23.

The other end of the bellows 21 is sealed to a head 30 by means shown as a ring of solder 31. The head 30 is formed with a hollow, inwardly projecting cylindrical member 32, having a closed end 33 terminating in a pin 34 which protrudes through the opening 20 and is positioned and shaped to enter the slot 13 of the screw 10.

A cap 40 is provided with an annular flange 41 which is journalled in the flange 16 of the plate 15 and is secured in position by a split ring 42 seated in an annular groove in the flange 16. The cap 40 is formed with a top 43 having a screw driver slot 44 therein and may have a knurled external surface 45. A pin 46 is formed integrally, with or is attached to the inside of the top 43 of the cap 40. The pin 46 is inclined to the axis of the cap 40 and in the embodiment shown is attached eccentrically to the top 43 and intersects the axis of the cap at the point 47. The pin 46 fits into and turns in the cylindrical member 32 and at its end engages a ball 48 which rests against the end 33 of the cylindrical member and forms a thrust bearing to so position the bellows 21 that suitable clearance is provided between the head 30 and the top 43 of the cap 40.

In assembling the device the bellows carrying the head 30 is first attached to the plate 15. The cap 40 is then positioned with the pin 46 suitably inserted in the member 32 and is secured by the split ring 42. The unit thus formed may be inserted in the casing 14 and secured by the ring of solder 18.

In operation, turning the cap 40 causes the pin 46 to swing about the point 47 in the same manner as though a fixed bearing were provided at that point. The bellows 21 and head 30 rock with the movement of the pin 46 but do not rotate as the pin 46 is mounted to rotate freely within the member 32. The pin 34 forms in effect an extension of the pin 46 but is located within the bellows and rocks or swings about the point 47 without rotating about its own axis. The end of the pin 34 thus describes an arc corresponding to the arc of movement of the external cap 40 and, being eccentrically constrained in the slot 13, causes a corresponding adjustment of the set screw 10. The device accordingly transmits rotary motion through the medium of a non-rotating shaft which is sealed within a flexible bellows.

It is to be noted that the point 47 at which the pin 46 intersects the axis of the cap 40 may be shifted along the axis of the cap 40 by varying the inclination of the pin 46 and its point of attachment to the cover 43. In the embodiment shown the point 47 lies at about the mid-point of the bellows 21. As the point approaches the head 30 of the bellows the rocking movement of the head 30 and consequent deflection of the bellows 21 decreases.

It is to be understood that the coupling and transmission unit is of general application for the transmission of rotary motion between a sealed member and an external member and is not restricted to the particular application shown.

What is claimed is:

1. A device for transmitting rotary motion to a rotary member within a sealed casing from an external member, comprising a plate having a hole therein and adapted to be hermetically attached to a casing, a cap covering said hole and bearing with its open end on the plate for rotative movement about its axis, a flexible bellows in the cap having one end attached to the plate about the hole and sealed thereto, a head attached to and sealing the other end of the bellows and having an axial extension on its inner face protruding through the hole in the plate and having an axial bore for a portion of its length at its attached end, and an angularly disposed pin attached to the head of the cap and entered into said bore.

2. A device for transmitting rotary motion to a rotary member within a sealed casing from an external member, comprising a plate having a hole therein and adapted to be hermetically attached to a casing, a cap covering said hole and bearing with its open end on the plate for rotative movement about its axis, a flexible bellows in the cap having one end attached to the plate about the hole and sealed thereto, a head attached to and sealing the other end of the bellows and having an axial extension on its inner face protruding through the hole in the plate and having an axial bore for a portion of its length at its attached end, a pin eccentrically attached to the head of the cap and entered into said bore and extending at an angle to and intersecting the axis of the bellows, and a ball in the bottom of the bore engaged by the end of said pin and acting as a thrust bearing to determine the spacing of the bellows head from the cap head.

FREDERICK D. HERBERT, Jr.

REFERENCES CITED

The following references are of record in the file of this patent:

UNITED STATES PATENTS

| Number | Name | Date |
|---|---|---|
| 1,514,968 | Hull | Nov. 11, 1924 |

FOREIGN PATENTS

| Number | Country | Date |
|---|---|---|
| 98,132 | Swiss | 1923 |